US008683808B2

(12) United States Patent
Venkataraman et al.

(10) Patent No.: US 8,683,808 B2
(45) Date of Patent: *Apr. 1, 2014

(54) LATE LEAN INJECTION CONTROL STRATEGY

(75) Inventors: Krishna Kumar Venkataraman, Simpsonville, SC (US); Lewis Berkley Davis, Jr., Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 359 days.

This patent is subject to a terminal disclaimer.

(21) Appl. No.: 12/349,869

(22) Filed: Jan. 7, 2009

(65) Prior Publication Data

US 2010/0170219 A1    Jul. 8, 2010

(51) Int. Cl.
*F02C 7/228* (2006.01)
*F23R 3/34* (2006.01)
*F23R 3/36* (2006.01)

(52) U.S. Cl.
USPC ........... 60/772; 60/39.37; 60/734; 60/39.281; 60/39.463

(58) Field of Classification Search
CPC .............. F02C 7/228; F02C 9/34; F02C 9/40; F02C 9/26; F23R 3/346; F23R 3/34; F23R 3/36; F23R 3/46
USPC ........ 60/733, 735, 746, 747, 740, 752, 39.37, 60/772, 39.281, 39.463, 734
See application file for complete search history.

(56) References Cited

U.S. PATENT DOCUMENTS

| 3,045,425 | A | * | 7/1962 | Seifferlein | .................. 60/39.49 |
| 3,877,219 | A | | 4/1975 | Hagen | |
| 4,735,052 | A | * | 4/1988 | Maeda et al. | .................. 60/733 |
| 5,163,284 | A | | 11/1992 | Shekleton | |
| 5,235,804 | A | | 8/1993 | Colket, III et al. | |

(Continued)

FOREIGN PATENT DOCUMENTS

| EP | 1605208 A1 | 12/2005 |
| EP | 1662116 A1 | 5/2006 |

(Continued)

OTHER PUBLICATIONS

Davis et al.: "DDry Lox NOx Combustion Systems for GE Heavy-Duty Gas Turbines," Oct. 2000, GE Power Systems, pp. 1-22.

(Continued)

*Primary Examiner* — Ted Kim
(74) *Attorney, Agent, or Firm* — Cantor Colburn LLP (57) ABSTRACT

A gas turbine engine is provided and includes a combustor having a first interior in which a first fuel supplied thereto by a fuel circuit is combustible, a turbine, a transition zone, including a second interior in which a second fuel supplied thereto by the fuel circuit and the products of the combustion of the first fuel are combustible, a plurality of fuel injectors, which are structurally supported by the transition zone and coupled to the fuel circuit, and which are configured to supply the second fuel to the second interior in any one of a single axial stage, multiple axial stages, a single axial circumferential stage and multiple axial circumferential stages, and a control system coupled to the fuel circuit and configured to control relative amounts of the first and second fuels supplied by the fuel circuit to the first and second interiors.

15 Claims, 9 Drawing Sheets

(56) References Cited

U.S. PATENT DOCUMENTS

| | | | |
|---|---|---|---|
| 5,584,684 A * | 12/1996 | Dobbeling et al. | 60/746 |
| 5,802,854 A * | 9/1998 | Maeda et al. | 60/737 |
| 5,901,547 A * | 5/1999 | Smith et al. | 60/773 |
| 5,943,866 A | 8/1999 | Lovett et al. | |
| 5,974,781 A | 11/1999 | Correa et al. | |
| 6,047,550 A | 4/2000 | Beebe | |
| 6,105,359 A | 8/2000 | Wilson | |
| 6,192,688 B1 | 2/2001 | Beebe | |
| 6,201,029 B1 | 3/2001 | Waycuilis | |
| 6,378,310 B1 | 4/2002 | Le Gal et al. | |
| 6,513,334 B2 | 2/2003 | Varney | |
| 6,868,676 B1 | 3/2005 | Haynes | |
| 7,395,670 B1 | 7/2008 | Drnevich et al. | |
| 7,493,767 B2 | 2/2009 | Bunker et al. | |
| 7,810,333 B2 | 10/2010 | Kraemer et al. | |
| 7,886,539 B2 * | 2/2011 | Cai | 60/733 |
| 8,061,118 B2 | 11/2011 | Kothnur et al. | |
| 8,397,510 B2 | 3/2013 | Dodo et al. | |
| 8,529,646 B2 | 9/2013 | Eskin et al. | |
| 2007/0271024 A1 * | 11/2007 | Fujii et al. | 701/100 |
| 2007/0277530 A1 | 12/2007 | Dinu et al. | |
| 2008/0034759 A1 | 2/2008 | Bulman et al. | |
| 2008/0078160 A1 | 4/2008 | Kraemer et al. | |
| 2008/0209911 A1 | 9/2008 | Schwarz et al. | |
| 2008/0264033 A1 * | 10/2008 | Lacy et al. | 60/752 |
| 2009/0084082 A1 * | 4/2009 | Martin et al. | 60/746 |
| 2010/0043441 A1 | 2/2010 | Hessler et al. | |
| 2010/0064691 A1 | 3/2010 | Laster et al. | |
| 2010/0071374 A1 | 3/2010 | Fox et al. | |
| 2010/0115953 A1 * | 5/2010 | Davis et al. | 60/737 |

FOREIGN PATENT DOCUMENTS

| | | |
|---|---|---|
| GB | 881935 | 11/1961 |
| GB | 2289326 A | 11/1995 |
| WO | 2009038625 A2 | 3/2009 |
| WO | 2009038652 A2 | 3/2009 |

OTHER PUBLICATIONS

"GE Energy's Enhanced Gas Turbine Emissions Technology Wins Ecomagination Rating," May 2007, GE Press Release.

Krishna Venkataraman et al.; "Late Lean Injection With Expanded Fuel Flexibility"; General Electric Disclosure No. 230889-1; pp. 1-15, Jan. 2009.

Krishna Venkataraman et al.; "Late Lean Injection System Configuration"; General Electric Disclosure No. 230087-1; pp. 1-15, Jan. 2009.

Krishna Venkataraman et al.; "Late Lean Injection Fuel Injector Configurations"; General Electric Disclosure No. 230351-1; pp. 1-15, Jan. 2009.

Krishna Venkataraman et al.; "Late Lean Injection with Adjustable Air Splits"; General Electric Disclosure No. 230887-1; pp. 1-17, Jan. 2009.

Krishna Venkataraman et al.; "Late Lean Injection for Fuel Flexibility"; General Electric Disclosure No. 230779-1; pp. 1-17, Jan. 2009.

Krishna Venkataraman et al.; "Late Lean Injection Fuel Staging Configurations"; General Electric Disclosure No. 230769-1; pp. 1-17, Jan. 2009.

European Search Report; European Application No. 09180632.3-2321/2206967; Date of Mailing: Feb. 13, 2012; 11 pages.

Non-Final Office Action; U.S. Appl. No. 13/345,362; Date of Mailing: Mar. 6, 2012: 11 pages.

Non-Final Office Action; U.S. Appl. No. 13/349,963; Date of Mailing: Feb. 7, 2012: 23 pages.

Office Action and Search Report from CN Application No. 201010003966.2 dated May 28, 2013.

Search Report and Written Opinion from EP Application No. 09180047.4 dated Mar. 27, 2012.

European Office Action issued in European Application No. 09 180 047.4 on Mar. 6, 2013.

European Office Action issued in European Application No. 09 180 256.1 on Feb. 27, 2013.

European Office Action issued in European Application No. 09 180 255.3 on Mar. 6, 2013.

* cited by examiner

LATE LEAN INJECTION CONTROL STRATEGY

CROSS REFERENCE TO RELATED APPLICATIONS

This application is related to the following applications: "Late Lean Injection with Expanded Fuel Flexibility"; "Late Lean Injection System Configuration"; "Late Lean Injection Fuel Staging Configurations"; "Late Lean Injection with Adjustable Air Splits"; "Late Lean Injection for Fuel Flexibility" and "Late Lean Injection Fuel Injector Configurations", each of which is being filed concurrently herewith and the contents of which are incorporated herein by reference thereto.

BACKGROUND OF THE INVENTION

Aspects of the present invention are directed to late lean injection (LLI) fuel staging configurations and methods of achieving the same.

Currently, some gas turbine engines fail to operate at high efficiencies and produce undesirable air polluting emissions. The primary air polluting emissions usually produced by turbines burning conventional hydrocarbon fuels are oxides of nitrogen, carbon monoxide and unburned hydrocarbons. To this end, since oxidation of, e.g., molecular nitrogen, in gas turbine engines is dependent upon a high temperature in the combustor and the residence time for the reactants at the high temperature within the combustor, a level of thermal NOx formation is reduced by maintaining the combustor temperature below the level at which thermal NOx is formed or by limiting the residence time for the reactants at the high temperatures such that there is insufficient time for the NOx formation reactions to progress.

One temperature controlling method involves the premixing of fuel and air to form a lean mixture thereof prior to combustion. However, it has been seen that, for heavy duty industrial gas turbines, even with the use of premixed lean fuels, the required temperatures of the combustion products are so high that the combustor must be operated with peak gas temperatures in the reaction zone that exceed the thermal NOx formation threshold temperature, resulting in significant NOx formation.

BRIEF DESCRIPTION OF THE INVENTION

According to one aspect of the invention, a gas turbine engine is provided and includes a combustor having a first interior in which a first fuel supplied thereto by a fuel circuit is combustible, a turbine, including rotating turbine blades, into which products of at least the combustion of the first fuel are receivable to power the rotation of the turbine blades, a transition zone, including a second interior in which a second fuel supplied thereto by the fuel circuit and the products of the combustion of the first fuel are combustible, the transition zone being disposed to fluidly couple the combustor and the turbine to one another, a plurality of fuel injectors, which are structurally supported by the transition zone and coupled to the fuel circuit, and which are configured to supply the second fuel to the second interior in any one of a single axial stage, multiple axial stages, a single axial circumferential stage and multiple axial circumferential stages, and a control system coupled to the fuel circuit and configured to control relative amounts of the first and second fuels supplied by the fuel circuit to the first and second interiors.

According to another aspect of the invention, a gas turbine engine including a combustor having a first interior in which a first fuel supplied thereto by a fuel circuit is combustible and a turbine, including rotating turbine blades, into which products of at least the combustion of the first fuel are receivable to power the rotation of the turbine blades is provided and includes a transition zone, including a second interior in which a second fuel supplied thereto by the fuel circuit and the products of the combustion of the first fuel are combustible, the transition zone being disposed to fluidly couple the combustor and the turbine to one another, a plurality of fuel injectors, which are structurally supported by the transition zone and coupled to the fuel circuit, and which are configured to supply the second fuel to the second interior in any one of a single axial stage, multiple axial stages, a single axial circumferential stage and multiple axial circumferential stages, and a control system coupled to the fuel circuit and configured to control relative amounts of the first and second fuels supplied by the fuel circuit to the first and second interiors.

According to yet another aspect of the invention, a method of operating a gas turbine engine in which a turbine is fluidly coupled to a combustor by a transition zone interposed therebetween, is provided and includes supplying a first fuel to a first interior within the combustor, combusting the first fuel in the first interior within the combustor, supplying a second fuel to a second interior within the transition zone in any one of a single axial stage, multiple axial stages, a single axial circumferential stage and multiple axial circumferential stages, combusting the second fuel and a stream of combustion products, received from the first interior, in the second interior within the transition zone, and controlling relative amounts of the first and second fuels supplied to the first and second interiors.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
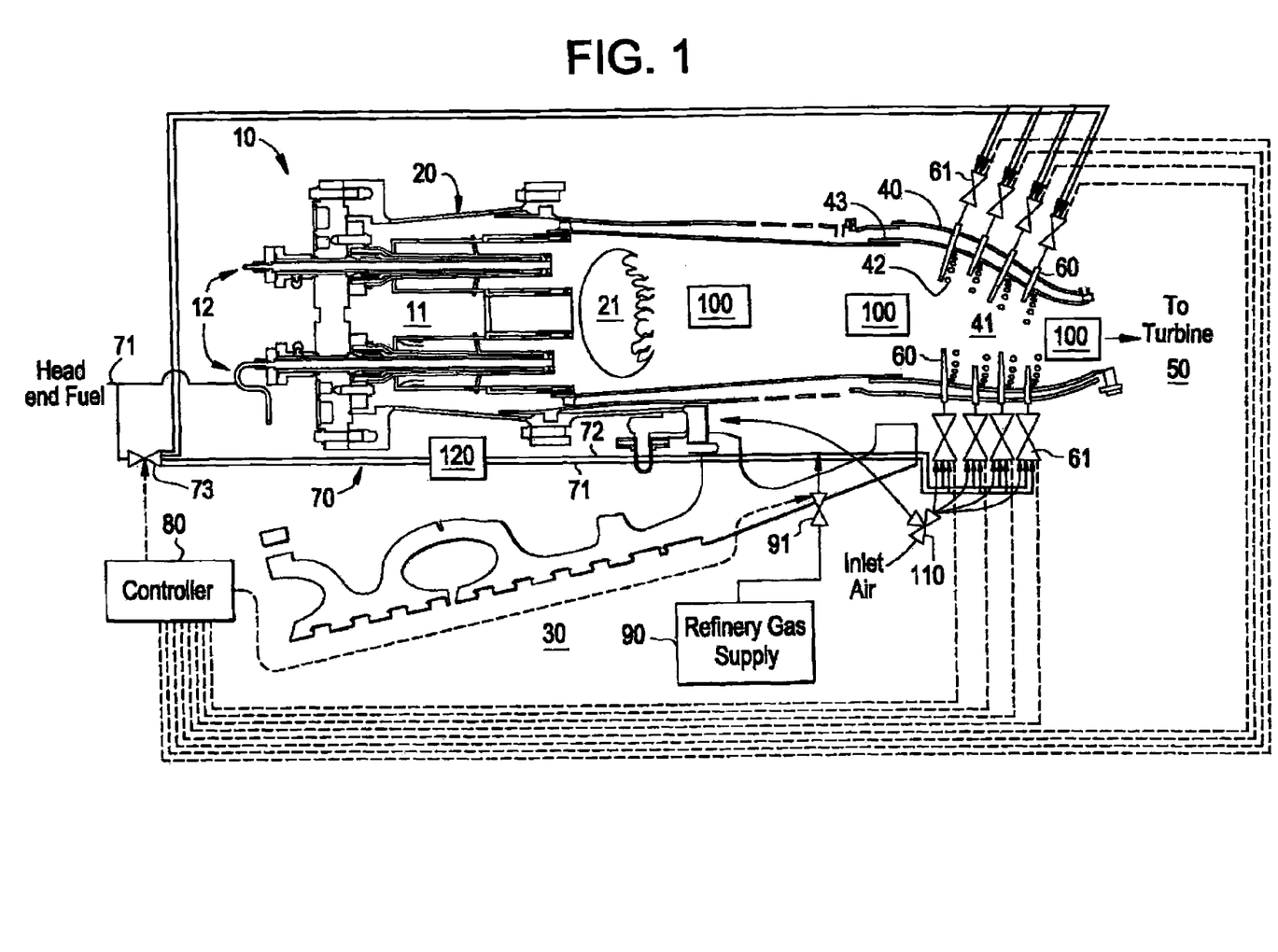
FIG. 1 is a side sectional view of a turbine including late lean injection capability.

With reference to FIG. 1, a gas turbine engine 10 is provided and includes a combustor 20 having a first interior 21 in which a first fuel supplied thereto by fuel circuit 70 is combustible, a compressor 30 by which inlet air is compressed and provided to at least the combustor 20 and a transition zone 43 and a turbine 50, including rotating turbine blades, into which products of at least the combustion of the first fuel are receivable to power a rotation of the turbine blades. The transition zone 43 is disposed to fluidly couple the combustor 20 and the turbine 50 and includes a second interior 41 in which a second fuel supplied thereto by the fuel circuit 70 and the products of the combustion of the first fuel are combustible. As shown, the combustor 20 and the transition zone 43 combine with one another to generally have a form of a head end 11, which may have various configurations, as will be discussed below.

As shown in FIG. 1, the head end 11 may include multiple premixing nozzles 12. However, as shown in FIGS. 4A-4D, other head end 11 configurations are possible. Such alternate configurations include, but are not limited to, the standard combustor configuration 13 of FIG. 4A, the Dry Low NOx (DLN) 1+ combustor configuration 14 of FIG. 4B, the DLN 2+ combustor configuration 15 of FIG. 4C and the DLN 2.6/2.6+ combustor configuration 16 of FIG. 4D. Still other combustor configurations include Integrated Gasification Combined Cycle (IGCC) head ends, catalytic head ends, diffusion style head ends and Multi-Nozzle Quiet Combustion (MNQC) style head ends.

Figure 4A:
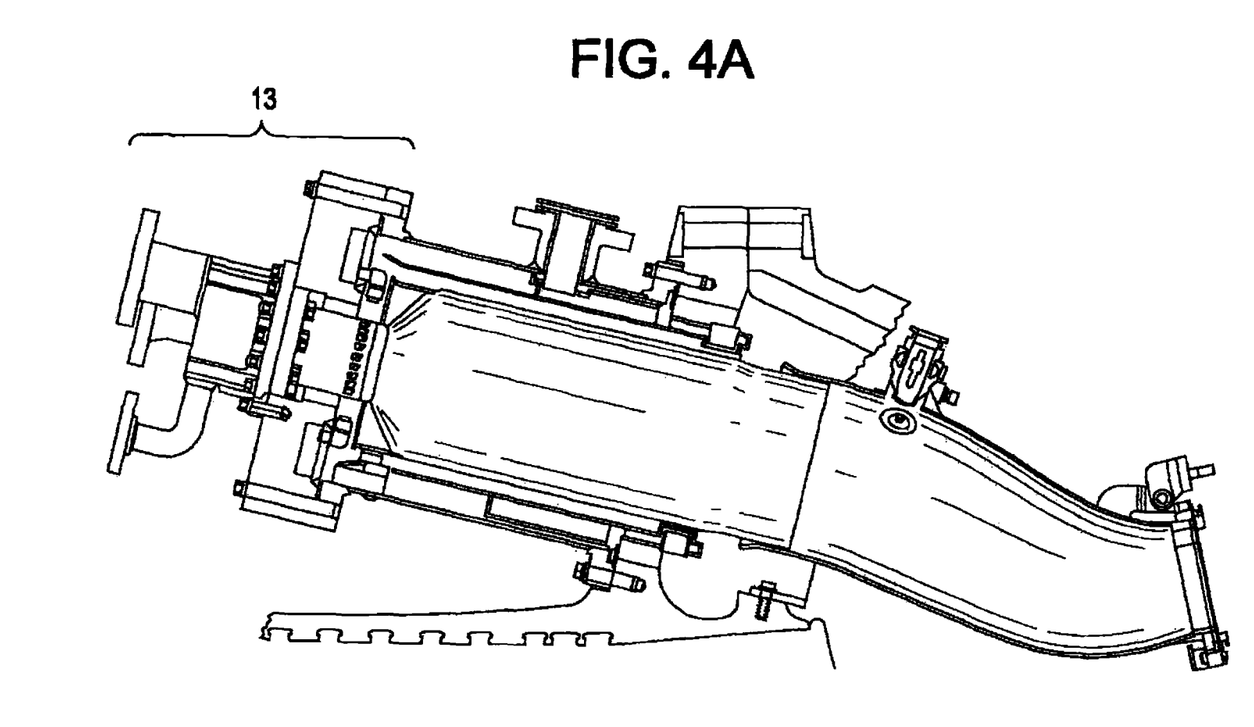
FIGS. 4A-4D are side sectional views of various head end configurations.
Figure 4B:
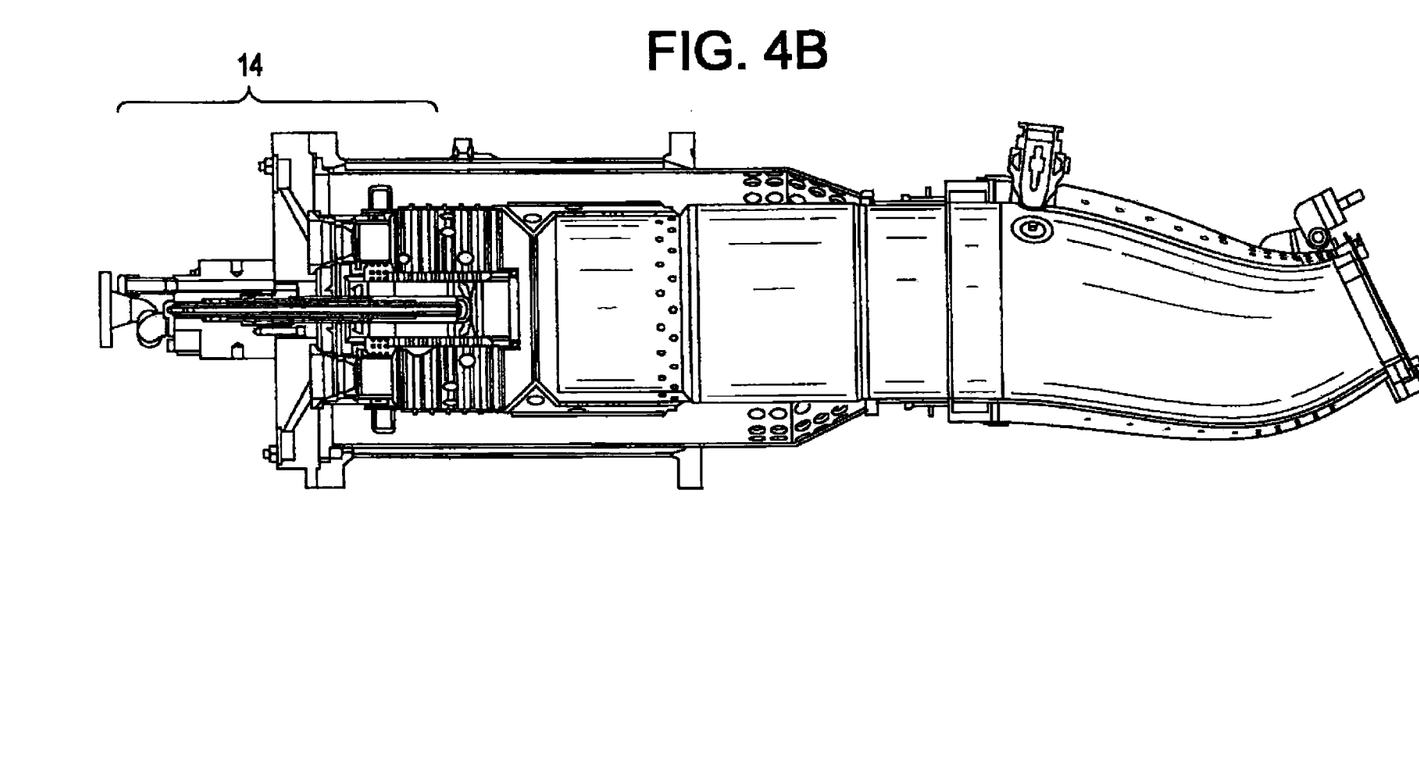
Figure 4C:
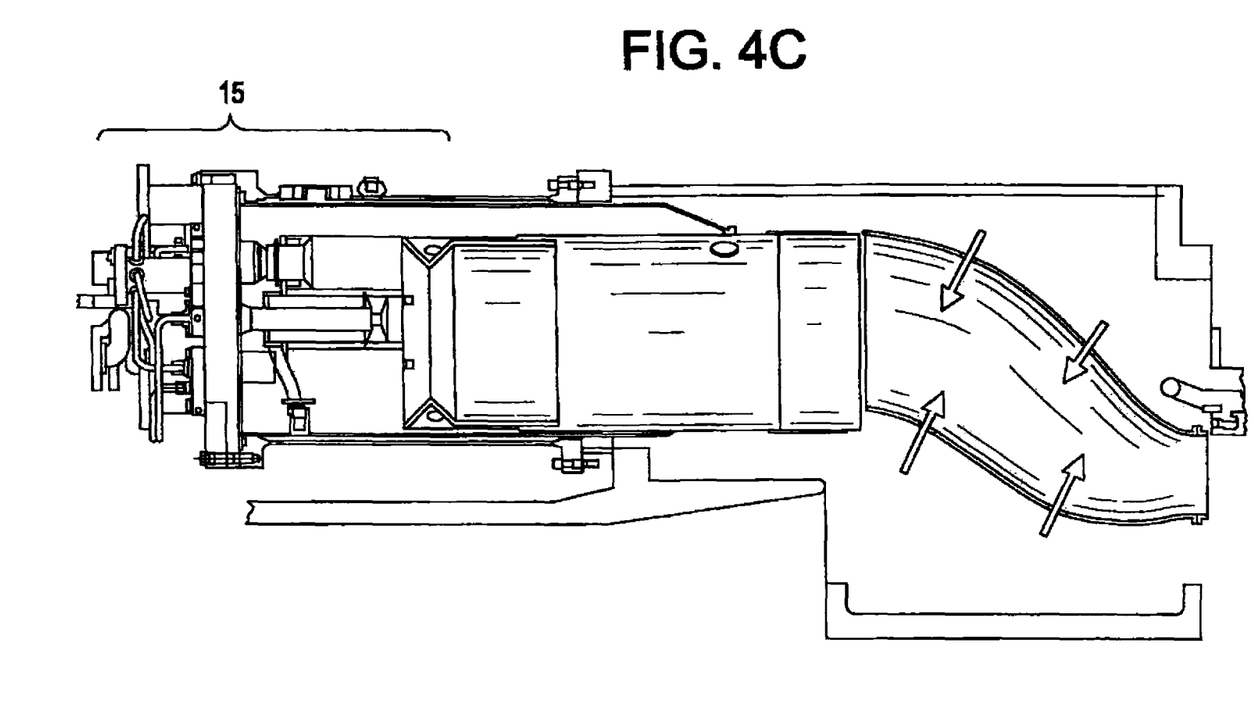
Figure 4D:
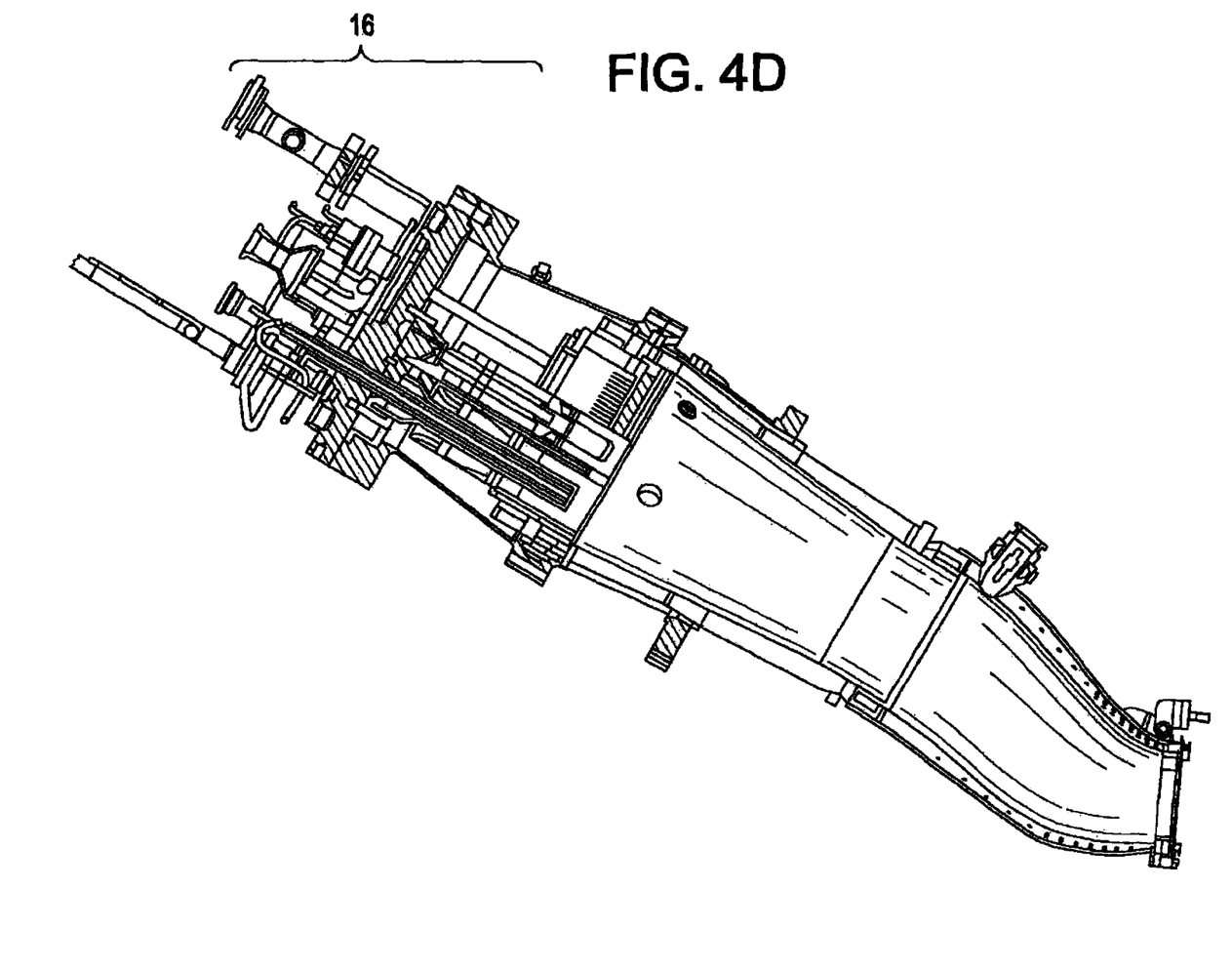

For each of the above-noted head end 11 configurations, it is understood that versions of the configurations may be late lean injection (LLI) compatible. An LLI compatible combustor is any combustor with either an exit temperature that exceeds 2500° F. or handles fuels with components that are more reactive than methane with a hot side residence time greater than 10 ms. As an example, an LLI compatible version of the DLN 1+ combustor configuration 14 may have an exit temperature that is less than 2500° F. but may handle fuels with components that are more reactive than methane. An LLI compatible version of a diffusion style head end combustor may have exit temperatures in excess of 2500° F. and may handle fuels with components that are more reactive than methane. Similarly, an LLI compatible version of the DLN 2.0/DLN 2+ combustor configuration 15 may have an exit temperature in excess of 2500° F. and may handle fuels with components that are more reactive than methane while an LLI compatible version of catalytic head ends or the DLN 2.6/2.6+ combustor configuration 16 may have an exit temperature in excess of 2500° F. and may handle fuels with components more reactive than methane.

A plurality of fuel injectors 60 are each structurally supported by an exterior wall of the transition zone 43 or by an exterior wall of a sleeve 40 around the transition zone 43 and extend into the second interior 41 to varying depths. With this configuration, the fuel injectors 60 are each configured to provide LLI fuel staging capability. That is, the fuel injectors 60 are each configured to supply the second fuel (i.e., LLI fuel) to the second interior 41 by, e.g., fuel injection in a direction that is generally transverse to a predominant flow direction through the transition zone 43, in any one of a single axial stage, multiple axial stages, a single axial circumferential stage and multiple axial circumferential stages. In so doing, conditions within the combustor 20 and the transition zone 43 are staged to create local zones of stable combustion.

Figure 5A:
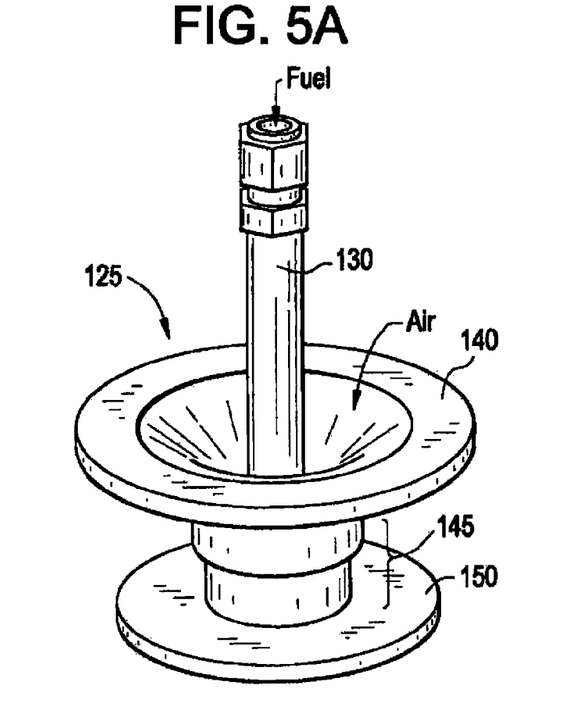
FIGS. 5A-5D are perspective views of various fuel injector configurations.
Figure 5B:
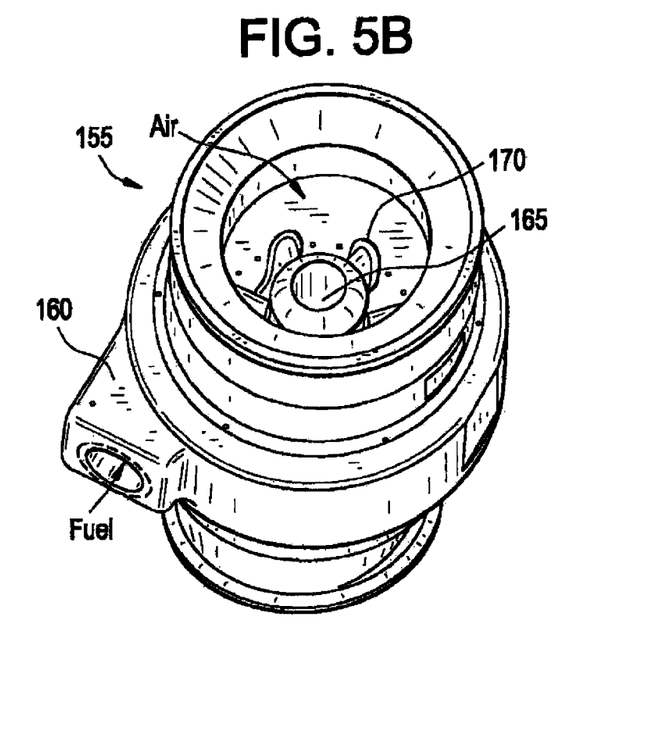
Figure 5C:
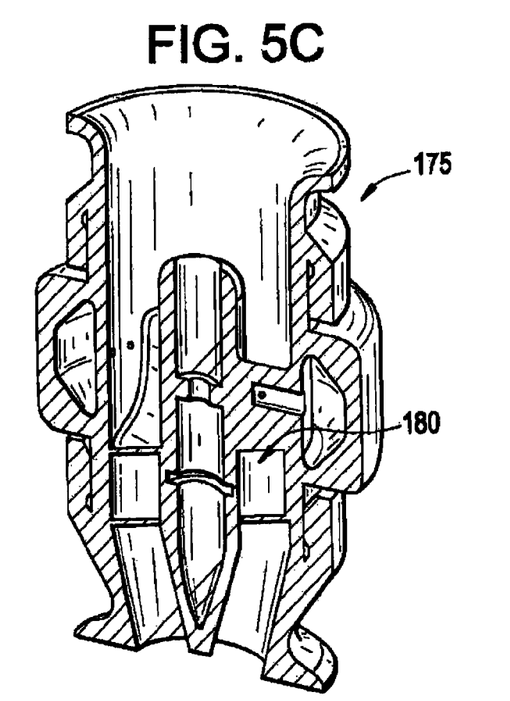
Figure 5D:
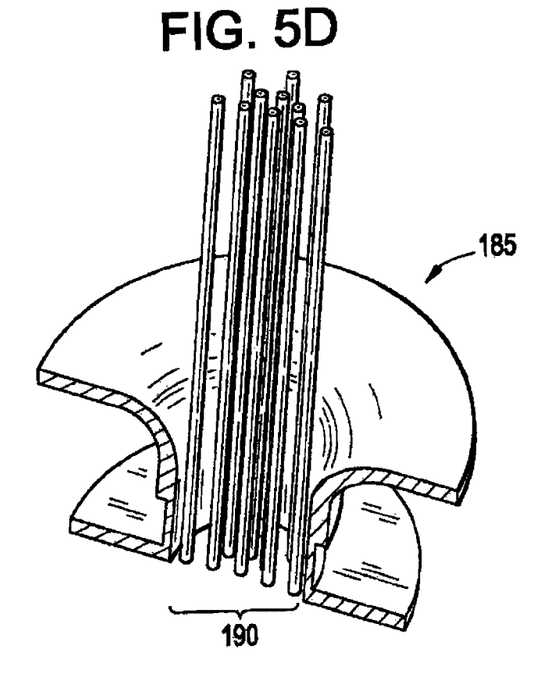

With reference to FIGS. 5A-5D, it is seen that the fuel injectors 60 can have various features and functionalities. For example, as shown in FIG. 5A, the fuel injectors 60 can include a tube-in-tube injector configuration 125. In this configuration, fuel is actively fed to the interior 41 of the transition zone 43 through a nozzle in a tube 130 and air is passively fed through an annular space between the tube 130 and the sleeve 145 which extends from the impingement sleeve surface 140 to the interface part 150. As shown in FIG. 5B, the fuel injectors 60 can also include swirl injectors 155. In this configuration, fuel is actively fed to the interior 41 of the transition zone 43 through a manifold 160 and air is passively fed through a central purge 165 and/or by way of a swirler 170. In addition, as shown in FIGS. 5C and 5D, other examples of fuel injector 60 configurations include a rich catalytic injector configuration 175, which includes rich catalytic elements 180, and multi-tube/showerhead injector configurations 185, which include multiple tubes 190 through which fuel is fed to the transition zone 43. In each of these cases, it is understood that the fuel injectors 60 can be coupled to the transition zone 43 at locations that correspond to pre-existing dilution holes 42, if any, on the outer surface of the transition zone 43. In this way, since additional holes need not be drilled into the outer surface of the transition zone 43, manufacturing costs and negative performance effects are limited or substantially reduced. If dilution holes 42 do not exist already, fuel injectors 60 may be placed as required on the exterior of the transition zone 43.

In accordance with embodiments, the single axial stage includes a currently operating single fuel injector 60, the multiple axial stages include multiple currently operating fuel injectors 60, which are respectively disposed at multiple axial locations of the transition zone 43, the single axial circumferential stage includes multiple currently operating fuel injectors 60 respectively disposed around a circumference of a single axial location of the transition zone 43, and the multiple axial circumferential stages include multiple currently operating fuel injectors 60, which are disposed around a circumference of the transition zone 43 at multiple axial locations thereof.

Here, where multiple fuel injectors 60 are disposed around a circumference of the transition zone 43, the fuel injectors 60 may be spaced substantially evenly or unevenly from one another. As an example, eight or ten fuel injectors 60 may be employed at a particular circumferential stage with 2, 3, 4 or 5 fuel injectors 60 installed with varying degrees of separation from one another on northern and southern hemispheres of the transition zone 43. Also, where multiple fuel injectors 60 are disposed at multiple axial stages of the transition zone 43, the fuel injectors 60 may be in-line and/or staggered with respect to one another.

During operations of the gas turbine engine 10, each of the fuel injectors 60 may be jointly or separately activated or deactivated so as to form the currently effective one of the single axial stage, the multiple axial stages, the single axial circumferential stage and the multiple axial circumferential stages. To this end, it is understood that the fuel injectors 60 may each be supplied with LLI fuel by way of the fuel circuit 70 via a valve 61 disposed between a corresponding fuel injector 60 and a branch 71 or 72 of the fuel circuit 70. The valve 61 signal communicates with a controller 80 that sends a signal to the valve 61 that causes the valve 61 to open or close and to thereby activate or deactivate the corresponding fuel injector 60.

Thus, if it is currently desirable to have each fuel injector 60 currently activated (i.e., multiple axial circumferential stages), the controller 80 signals to each of the valves 61 to open and thereby activate each of the fuel injectors 60. Conversely, if it is currently desirable to have each fuel injector 60 of a particular axial stage of the transition zone 43 currently activated (i.e., single axial circumferential stage), the controller 80 signals to each of the valves 61 corresponding to only the fuel injectors 60 of the single axial circumferential stage to open and thereby activate each of the fuel injectors 60. Of course, this control system is merely exemplary and it is understood that multiple combinations of fuel injector configurations are possible and that other systems and methods for controlling at least one of the activation and deactivation of the fuel injectors 60 are available.

In addition, with the presence of multiple fuel injectors 60 having multiple fuel injector configurations, as described above, the controller 80 may be further configured to activate only those fuel injectors 60 having certain fuel injector configurations at any one time. Thus, if it is currently desirable to have each fuel injector 60 with a tube in tube injector configuration 125 currently activated, the controller 80 signals to each of the valves 61 corresponding to those fuel injectors 60 to open. Conversely, if it is currently desirable to have each fuel injector 60 that includes a swirl injector 155, the controller 80 signals to each of the valves 61 corresponding to only the fuel injectors 60 including swirl injectors 155 to open.

In accordance with another aspect of the invention, a method of operating a gas turbine engine 10, in which a turbine 50 is fluidly coupled to a combustor 20 by a transition zone 43 interposed therebetween, is provided. The method includes supplying a first fuel to a first interior 21 within the combustor 20, combusting the first fuel in the first interior 21 within the combustor 20, supplying a second fuel to a second interior 41 within the transition zone 43 in any one of a single axial stage, multiple axial stages, a single axial circumferential stage and multiple axial circumferential stages, and combusting the second fuel and a stream of combustion products, received from the first interior 21, in the second interior 41 within the transition zone.

Here, the supplying of the second fuel to the second interior 41 in the single axial stage includes activating a single fuel injector 60, the supplying of the second fuel to the second interior 41 in the multiple axial stages includes activating multiple fuel injectors 60 respectively disposed at multiple axial locations of the transition zone 43, the supplying of the second fuel to the second interior 41 in the single axial circumferential stage includes activating multiple fuel injectors 60 respectively disposed around a circumference of the transition zone 43 at a single axial location thereof, and the supplying of the second fuel to the second interior 41 in the multiple axial circumferential stages includes activating multiple fuel injectors 60 respectively disposed around a circumference of the transition zone 43 at multiple axial locations thereof.

Figure 2:
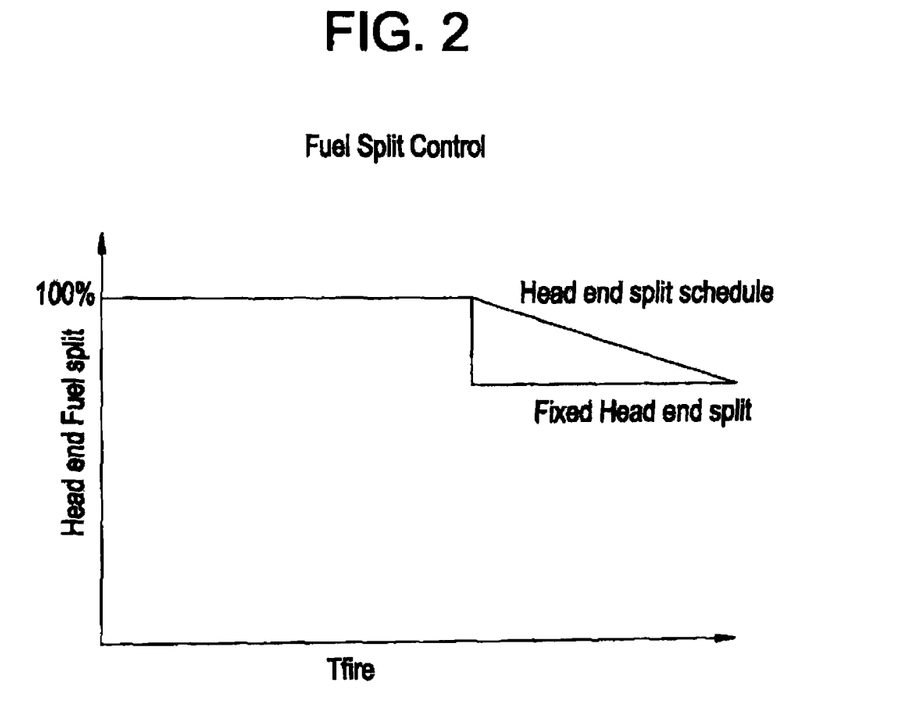
FIG. 2 is a graph illustrating a plot of a head end fuel split percentage versus a firing temperature of the turbine of FIG. 1.

With reference to FIG. 2, it is seen that FIG. 2 provides a graphical illustration of various options for fuel split controls. In FIG. 2, a percentage of a head end fuel split is plotted against a Tfire value, which is a measurement of a temperature within the combustor 20 and/or the transition zone 43. Since the controller 80 is further configured to control a flow direction of the first and second fuels toward the head end 11 and/or the fuel injectors 60, it is seen that LLI fuel staging can also be further controlled by the controller 80 in accordance with the control options shown in FIG. 2. To this end, the controller 80 is coupled to the valves 61, as discussed above, and the valve 73 to control the delivery of the second fuel to the fuel injectors 60 and to control the delivery of the first and/or the LLI fuel to the head end 11.

As shown in FIG. 2, a first option for such control is to employ a fixed head end split in which a percentage (<100%) of the first and/or the LLI fuel is delivered to the transition zone 43 for LLI fuel staging once a preselected value of Tfire is achieved. From that point, the percentage of the fuel delivered to the transition zone 43 remains substantially constant. A second option is to employ a head end split schedule. In this case, the percentage of LLI fuel increases proportionally, or in accordance with some other suitable function, as the value of Tfire increases beyond a preselected value. A third option is to make the percentage of the LLI fuel a function of any one or more of several characteristics of the interior environments of the combustor 20, the compressor 30, the transition zone 43 and/or the turbine 50. For example, the percentage could be made a function of Tcd or Pcd, which are measured compressor discharge temperature and pressure conditions, humidity readings from within the combustor 20, the compressor 30 or the transition zone 43, gas turbine exhaust temperature and/or T39, which is a calculated combustor exit temperature.

The third option discussed above may also be modified to account for a current Modified Wobbe Index (MWI). In this case, since it is known that the MWI measures energy density of fuel and that, for a given fuel nozzle area, a lower MWI indicates increased pressure ratios across the head end fuel nozzles that can cause undesirable dynamics to which LLI fuel nozzles are insensitive, the percentage of the LLI fuel could also be made a function of the MWI. This way, as the MWI increases, a larger percentage of LLI fuel is diverted to the transition zone 43. In accordance with each of these options, it is understood that thermocouples/pressure gauges 100, or any other suitable environmental measurement device, may be installed within the combustor 20, the compressor 30, the transition zone 43 and/or the turbine 50 as is deemed necessary to measure temperatures and pressures within the combustor 20, the compressor 30, the transition zone 43 and the turbine 50.

Figure 3:
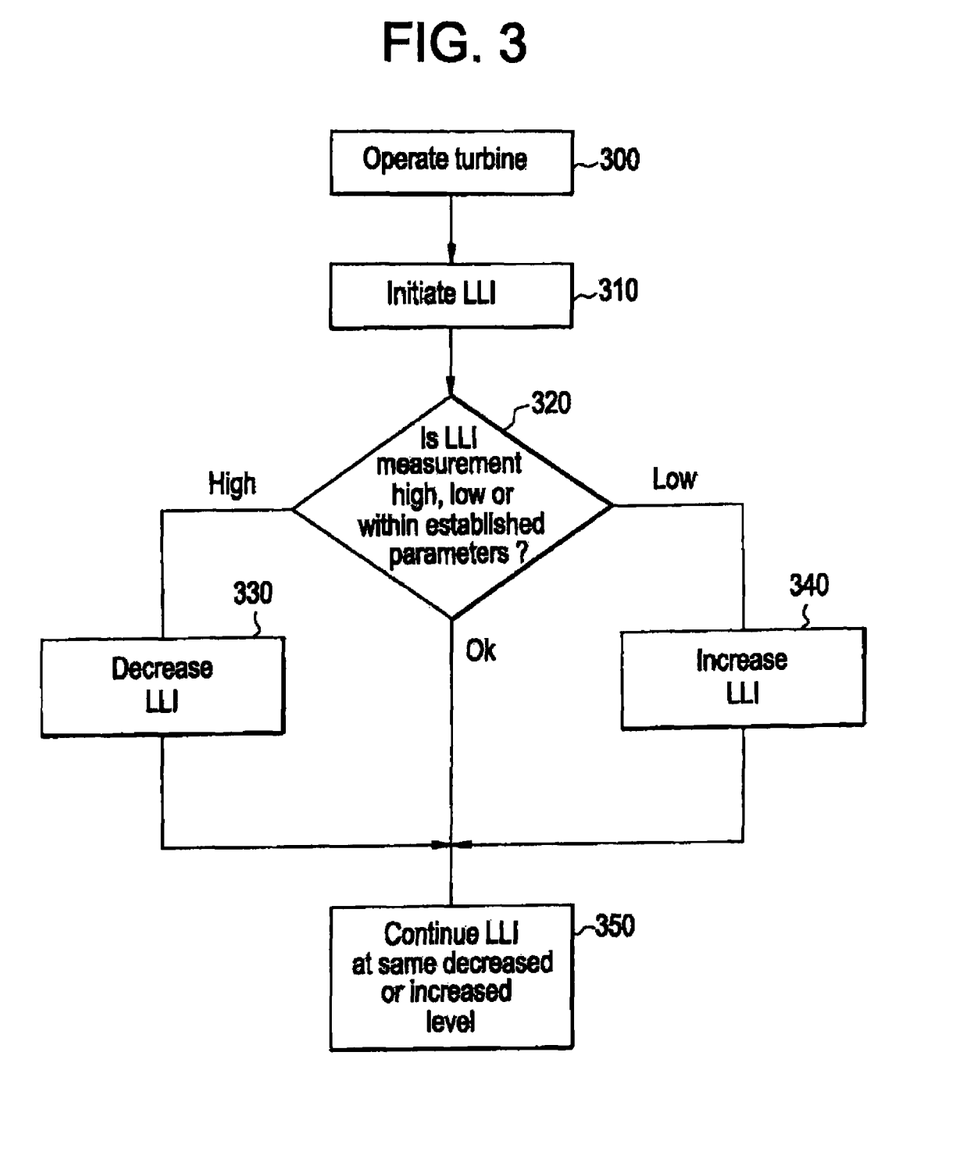
FIG. 3 is a flow diagram illustrating a method of operating the turbine of FIG. 1.

With reference to FIG. 3, it is seen that a method of controlling a turbine with LLI capability includes operating the turbine 300, initiating the LLI 310 after a certain period of time or once a preselected value of Tfire is achieved, and, in accordance with the first option, continuing to operate the LLI at the same level 350. Conversely, in accordance with the second option, the method includes continuing to operate the LLI at an increasing level 350. Meanwhile, in accordance with the third option, it is determined whether any particular measured characteristics of the combustor 20, the compressor 30 and/or the transition zone 43 are elevated or lower than established parameters 320 and, based on a result of the determining, the LLI level is decreased 330, increased 340 or maintained and, subsequently, the LLI operation is continued 350.

Still referring to FIG. 1, the controller 80 is further configured to control the 3-way valve 110 and, in some embodiments, an additional valve disposed on a manifold around the fuel injectors 60 or, as mentioned above, the valves 61. Thus, the controller 80 is able to control the air split of the inlet air delivered by the compressor 30 to the combustor 20 and the transition zone 43 or to each fuel injector 60. In this way, the controller 80 is able to modify fuel splits and air splits simultaneously. As such, the controller 80 can thereby create operational paths for a combustion system that respect optimal fuel to air ratios of the combustion system. In accordance with various embodiments of the invention, the 3-way valve 110 could be further integrated as a part of an overall air coolant system, extended turndown efforts and/or Department of Energy (DoE) programs.

As described above, the control of the 3-way valve 110 is accomplished in order to optimize fuel to air ratios of the combustion system. These ratios may be preselected as being based on specifications for the combustor 20 and the transition zone 43 or may be based on current environmental conditions. In this case, the controller 80 could increase the fuel to air ratio in either the combustor 20 or the transition zone 43 based on temperature and/or pressure readings generated by the thermocouples/pressure gauges 100 installed within the combustor 20, the compressor 30, the transition zone 43 and the turbine 50.

Late Lean Injection (LLI) can also allow for an injection of multiple gas streams, including alternate gases, such as refinery gases, into the transition zone 43 that non-LLI combustors are generally unable to handle. Highly reactive gases, such as refinery gases, typically cannot be handled by premixed combustors due to the concern for undesirable flameholding in the premixers. Refinery gases on the other hand, which may or may not be blended with natural gases can, in certain cases, be injected directly into the transition zone 43 without such problems, especially where the fuel injectors 60 are tolerant of flameholding. Here, where the refinery gases are blended with the natural gases, the amounts of the natural gases used can be a function of Tcd, Pcd, and T39, as described above. Also, where the refinery gases are injected into the transition zone 43, it is understood that flameholding sensitive premixers can be employed at the head end 11 to prevent or substantially reduce the likelihood of flameholding incidents.

As shown in FIG. 1, the alternate gases can be injected from source 90 into a branch 71 or 72 of the fuel circuit 70 via a refinery gas valve 91 that is controlled by controller 80. This way, when it is determined that alternate gases are to be injected into the transition zone 43, the controller 80 can open the refinery gas valve 91 such that the alternate gases can propagate through the fuel circuit 70 toward the fuel injectors 61.

As a further embodiment, it is understood that the alternate gases can be blended with natural gases to form the first fuel in compositions that reflect tolerances of the particular head end 11 in use. The alternate gases can be provided with or without such blending to form the second fuel.

In addition, it is further understood that the alternate gases may include refinery gases that are received by the fuel circuit 70 from the source 90, as mentioned above, and gases consisting of components that are more reactive than methane. More particularly, the alternate gases may include gases that contain a quantity of above about 0.5% by volume of hydrogen, a quantity of above about 5% by volume of ethane, a quantity of above about 10% by volume of propane, a quantity of above about 5% by volume of butane or a hydrocarbon above butane.

The fuel circuit 70 may also incorporate multiple branches 71 and 72 to accommodate for changes in fuel flow. The multiple branches 71 and 72 can then also be used to allow for large changes in fuel composition by affording additional fuel flow area or by introducing the fuel in a way that creates separate modes of combustion (i.e. diffusion and premixing). The branches 71 and 72 can also allow for variations in fuel wobbe number, fuel composition and for dynamic tuning. The branches 71 and 72 of the fuel circuit 70 can be embodied as braches of the fuel circuit 70, as additional fuel nozzles in the transition zone 43 or a combination of these options as well as other suitable options.

The branches 71 and 72 may further include a catalytic partial oxidation reactor (CPCR) 120 disposed along lengths thereof The CPCR 120 converts methane within the first or second fuels to hydrogen and/or partially oxidizes the methane without creating nitrogen oxides. As a result, since the reacted fuel used for the LLI is already partially oxidized, the fuel can be injected into the transition zone 43 even later than it otherwise would be.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gas turbine engine comprising:
a combustor having a first interior in which a first fuel supplied thereto by a fuel circuit is combustible;
a turbine, including rotating turbine blades, into which products of at least the combustion of the first fuel are receivable to power the rotation of the turbine blades;
a transition zone, including a second interior in which a second fuel supplied thereto by the fuel circuit and the products of the combustion of the first fuel are combustible, the transition zone being disposed to fluidly couple the combustor and the turbine to one another;
a plurality of late lean fuel injectors, which are structurally supported by the transition zone and coupled to the fuel circuit, and which are configured to supply the second fuel to the second interior in any one of a single axial stage, multiple axial stages, a single axial circumferential stage and multiple axial circumferential stages,
wherein the fuel circuit comprises a first part that delivers the first fuel to the first interior, multiple branches of a second part that deliver the second fuel to the second interior and multiple valves respectively associated with each of the plurality of the fuel injectors by which at least the second fuel and air are deliverable into the plurality of the fuel injectors from the multiple branches, respectively, the fuel circuit connected to two different sources of fuel comprising a first source and an alternate source of fuel, the first source and alternate source of fuel each being fluidly connectable to the first part and second part of the fuel circuit, and a blend of the first and alternate sources of fuel being fluidly connectable to the first part and second part of the fuel circuit; and
a control system coupled to the multiple valves of the fuel circuit and configured to control relative amounts of the first and second fuels supplied by the fuel circuit to the first and second interiors.

2. The gas turbine engine according to claim 1, wherein the control system controls the relative amounts of the first and second fuels in accordance with a fixed fuel split.

3. The gas turbine engine according to claim 1, wherein the control system controls the relative amounts of the first and second fuels in accordance with a fixed fuel split schedule.

4. The gas turbine engine according to claim 1, wherein the control system controls the relative amounts of the first and second fuels in accordance with a fuel split as a function of one or more environmental conditions.

5. The gas turbine engine according to claim 4, further comprising a compressor by which air is supplied to the first and second interiors for combustion, wherein the environmental conditions comprise temperature and/or pressure measurements within at least the combustor, the compressor, the transition zone and the turbine.

6. The gas turbine engine according to claim 5, wherein the environmental conditions comprise compressor discharge conditions.

7. The gas turbine engine according to claim 5, wherein the environmental conditions comprise a combustor exit temperature.

8. The gas turbine engine according to claim 1, wherein the fuel circuit further comprises a valve to control an amount of fuel transmittable from the first part to the multiple branches.

9. A method of operating a gas turbine engine in which a turbine is fluidly coupled to a combustor by a transition zone interposed therebetween, the method comprising:
supplying a first fuel to a first interior within the combustor;
combusting the first fuel in the first interior within the combustor;
supplying a second fuel to a second interior within the transition zone in any one of a single axial stage, multiple axial stages, a single axial circumferential stage and multiple axial circumferential stages;
combusting the second fuel and a stream of combustion products, received from the first interior, in the second interior within the transition zone; and
controlling relative amounts of the first and second fuels supplied to the first and second interiors,
wherein the supplying of the first and second fuels is achieved by a fuel circuit comprising:
a first part that delivers the first fuel to the first interior;
multiple branches of a second part that deliver the second fuel to the second interior; and
multiple valves respectively associated with each of a plurality of late lean fuel injectors by which at least the second fuel and air are deliverable into the plurality of the fuel injectors from the multiple branches, respectively, the fuel circuit connected to two different sources of fuel comprising a first source and an alternate source of fuel, the first source and alternate source of fuel each being fluidly connectable to the first part and second part of the fuel circuit, and a blend of the first and alternate sources of fuel being fluidly connectable to the first part and second part of the fuel circuit, and
the controlling is achieved by operating the multiple valves.

10. The method according to claim 9, wherein the controlling is achieved in accordance with a fuel fixed split.

11. The method according to claim 9, wherein the controlling is achieved in accordance with a fixed fuel split schedule.

12. The method according to claim 9, wherein the controlling is achieved in accordance with a fuel split as a function of one or more measured environmental conditions.

13. The method according to claim 12, wherein the environmental conditions comprise at least one of temperature and pressure measurements.

14. The method according to claim 9, wherein the fuel circuit further comprises a valve to control an amount of fuel transmittable from the first part to the multiple branches and the controlling is further achieved by operating the valve.

15. A gas turbine engine comprising:
a combustor having a first interior in which a first fuel supplied thereto by a fuel circuit is combustible;
a turbine, including rotating turbine blades, into which products of at least the combustion of the first fuel are receivable to power the rotation of the turbine blades;
a transition zone, including a second interior in which a second fuel supplied thereto by the fuel circuit and the products of the combustion of the first fuel are combustible, the transition zone being disposed to fluidly couple the combustor and the turbine to one another;
a plurality of late lean fuel injectors, which are structurally supported by the transition zone and coupled to the fuel circuit, and which are configured to supply the second fuel to the second interior in any one of a single axial stage, multiple axial stages, a single axial circumferential stage and multiple axial circumferential stages,
wherein the fuel circuit comprises a first part that delivers the first fuel to the first interior, multiple branches of a second part that deliver the second fuel to the second interior and multiple valves respectively associated with each of the plurality of the fuel injectors, each of the multiple valves being respectively coupled to each of the multiple branches of the second part and to a supply of inlet air such that at least the second fuel and air are deliverable by each of the multiple valves into the plurality of the fuel injectors from the multiple branches, respectively the fuel circuit connected to two different sources of fuel comprising a first source and an alternate source of fuel, the first source and alternate source of fuel each being fluidly connectable to the first part and second part of the fuel circuit, and a blend of the first and alternate sources of fuel being fluidly connectable to the first part and second part of the fuel circuit; and
a control system coupled to the multiple valves of the fuel circuit and configured to control relative amounts of the first and second fuels supplied by the fuel circuit to the first and second interiors.

* * * * *